United States Patent
Meng et al.

(10) Patent No.: US 9,918,077 B2
(45) Date of Patent: Mar. 13, 2018

(54) OBJECT SPACE CALIBRATION OF PLENOPTIC IMAGING SYSTEMS

(71) Applicants: Lingfei Meng, Redwood City, CA (US); Liyang Lu, Houston, TX (US); Noah Bedard, San Francisco, CA (US); Kathrin Berkner, Los Altos, CA (US)

(72) Inventors: Lingfei Meng, Redwood City, CA (US); Liyang Lu, Houston, TX (US); Noah Bedard, San Francisco, CA (US); Kathrin Berkner, Los Altos, CA (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/365,671

(22) Filed: Nov. 30, 2016

(65) Prior Publication Data

US 2017/0084034 A1    Mar. 23, 2017

Related U.S. Application Data

(63) Continuation of application No. 14/594,019, filed on Jan. 9, 2015, now Pat. No. 9,544,583.

(51) Int. Cl.
*H04N 17/00* (2006.01)
*G06T 7/80* (2017.01)

(52) U.S. Cl.
CPC ............ *H04N 17/002* (2013.01); *G06T 7/80* (2017.01); *G06T 2207/10052* (2013.01)

(58) Field of Classification Search
CPC ...... H04N 17/002; H04N 7/80; H04N 7/0018; G06T 2207/100522
USPC ........................................................ 348/187
See application file for complete search history.

(56) References Cited

U.S. PATENT DOCUMENTS

| | | | |
|---|---|---|---|
| 8,289,440 B2 | 10/2012 | Knight et al. | |
| 8,358,362 B2 | 1/2013 | Sato | |
| 8,681,249 B2 | 3/2014 | Kobayashi et al. | |
| 8,749,694 B2 | 6/2014 | Georgiev et al. | |
| 9,153,026 B2 | 10/2015 | Meng et al. | |

(Continued)

FOREIGN PATENT DOCUMENTS

| | | |
|---|---|---|
| EP | 2736262 | 5/2014 |
| JP | 2012-205014 | 10/2012 |
| WO | WO 2014/147562 | 9/2014 |

OTHER PUBLICATIONS

Dansereau, D. et al., "Decoding, Calibration and Rectification for Lenselet-Based Plenoptic Cameras." CVPR, 2013, 8 pages.

(Continued)

*Primary Examiner* — Michael Lee
(74) *Attorney, Agent, or Firm* — Fenwick & West LLP

(57) ABSTRACT

A collimated object is adjustable to produce collimated light propagating along different propagation directions. The plenoptic imaging system under calibration captures plenoptic images of the object adjusted to different propagation directions. The captured plenoptic images includes superpixels, each of which includes subpixels. Each subpixel captures light from a corresponding light field viewing direction. Based on the captured plenoptic images, a calibration module calculates which propagation directions map to which subpixels. The mapping defines the light field viewing directions for the subpixels. This can be used to improve processing of plenoptic images captured by the plenoptic imaging system.

20 Claims, 9 Drawing Sheets

(56) References Cited

U.S. PATENT DOCUMENTS

| | | |
|---|---|---|
| 2010/0265385 A1 | 10/2010 | Knight et al. |
| 2011/0122308 A1 | 5/2011 | Duparre |
| 2011/0169994 A1 | 7/2011 | DiFrancesco et al. |
| 2013/0107102 A1* | 5/2013 | Thom .................. G06T 15/50 348/333.11 |
| 2013/0127901 A1 | 5/2013 | Georgiev et al. |
| 2013/0222606 A1 | 8/2013 | Pitts et al. |
| 2013/0321581 A1* | 12/2013 | El-Ghoroury ...... H04N 13/0207 348/46 |
| 2015/0178923 A1* | 6/2015 | Liang .................. H04N 5/2254 348/175 |

OTHER PUBLICATIONS

Ostu, N., "A Threshold Selection Method from Gray-Level Histogram," IEEE Transactions on Systems, Man and Cybernetics, 1979, pp. 62-66, vol. 9, No. 1.

"RxLive User Guide," Ratrix GmbH, Oct. 2011, 49 pages.

Rodriguez-Ramos, J. et al., "3d Imaging and Wavefront Sensing with a Plenoptic Objective," in Proceedings of SPIE, 2011, 80430R, 11 pages, vol. 8043.

U.S. Appl. No. 61/170,620, "Light Field Data Acquisition Devices, and Methods of Using and Manufacturing," Inventors: T. Knight et al., filed Apr. 18, 2009.

Thomason, C.M. et al., "Calibration of a Microlens Array for a Plenoptic Camera," 52.sup.nd Aerospace Sciences Meeting, Jan. 10, 2014, pp. 1-18.

European Extended Search Report, European Application No. 16150072.3, dated Jun. 8, 2016, 10 pages.

Fahringer, T. et al., "Tomographic Reconstruction of a 3-D Flow Field Using a Plenoptic Camera," 42.sup.nd AIAA Fluid Dynamics Conference and Exhibit, Jun. 25, 2012, pp. 1-13.

Japanese Office Action, Japanese Application No. 2016-001881, dated Nov. 22, 2016, 4 pages (with concise explanation of relevance).

United States Office Action, U.S. Appl. No. 14/594,019, dated Jun. 17, 2016, 7 pages.

United States Office Action, U.S. Appl. No. 14/594,019, dated Dec. 30, 2015, 7 pages.

\* cited by examiner

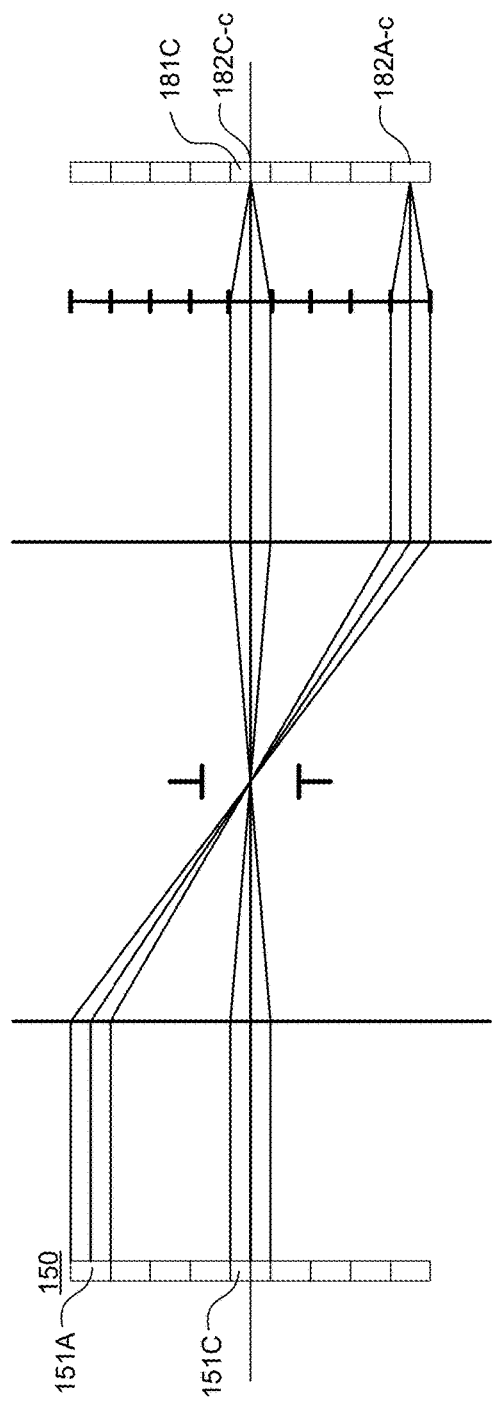
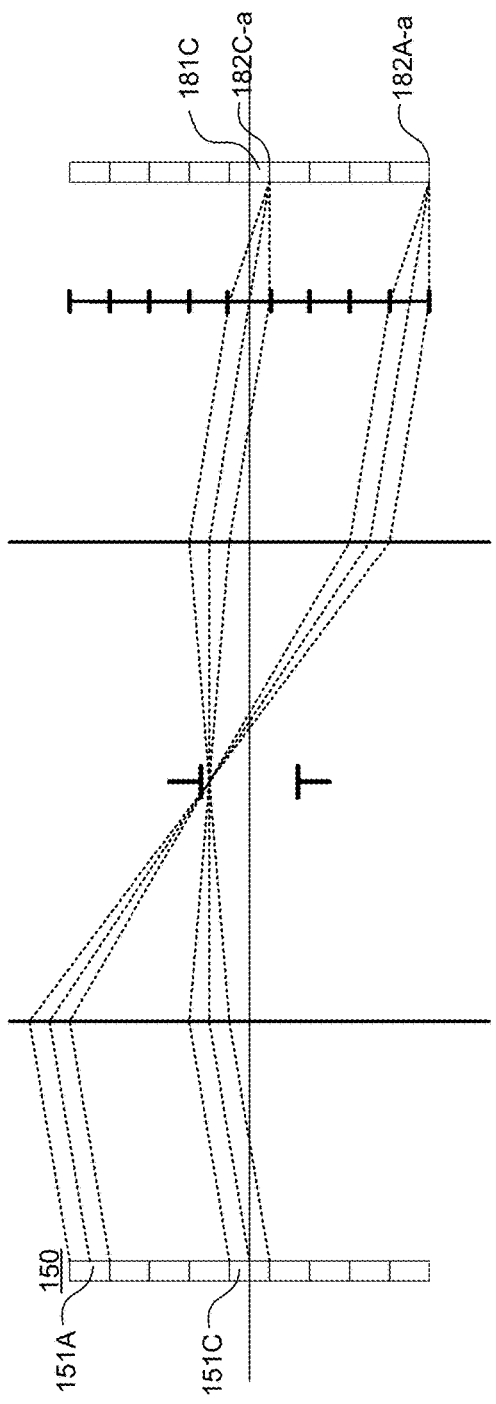
FIG. 3B
FIG. 3C

OBJECT SPACE CALIBRATION OF PLENOPTIC IMAGING SYSTEMS

CROSS REFERENCE TO RELATED APPLICATION

This application is a continuation of U.S. patent application Ser. No. 14/594,019, "Object Space Calibration of Plenoptic Imaging Systems," filed on Jan. 9, 2015, which is incorporated herein by reference in its entirety.

BACKGROUND

1. Field of the Invention

This technology relates generally to calibrating plenoptic imaging systems.

2. Description of the Related Art

The plenoptic imaging system has recently received increased attention. It can be used to recalculate a different focus point or point of view of an object, based on digital processing of the captured plenoptic image. The plenoptic imaging system also finds application in multi-modal imaging, using a multi-modal filter array in the pupil plane of the primary imaging module. Each filter is imaged at the sensor, effectively producing a multiplexed image of the object for each imaging modality of the filter array. Other applications for plenoptic imaging systems include varying depth of field imaging and high dynamic range imaging.

However, the architecture of a plenoptic imaging system is different from that of a conventional imaging system, and therefore requires different calibration and processing procedures. Several challenges are found in the processing of plenoptic images. First, the alignment of the microlens array is never perfect and the effect of rotation of the microlens array is quite observable. This rotation introduces a large amount of difficulties for image reconstruction because the data points do not fall onto a regular sampling grid. Second, for a modular system architecture, different detector arrays and microlens arrays could be used based on different applications. Manual determination of parameters, such as center of lenslet, pixels under each lenslet, spacing of lenslets, etc., is difficult and time consuming. Third, for different applications, different objective lenses could be used. The parameters necessary for image reconstruction are different when the plenoptic image data are taken with different objective lenses or at different focal settings.

Current techniques for calibrating plenoptic imaging systems involve imaging simple camera targets. These targets can be uniform white targets, grids, checkerboards, etc. The targets are typically illuminated with spatially incoherent light. For the case of the uniform target, light scattered from the target uniformly illuminates the aperture of the plenoptic camera's primary lens. The exit pupil from the primary lens is then imaged onto the sensor array by each microlens. Each "superpixel" in the sensor array is an image of the primary lens aperture (the exit pupil). Current image processing techniques analyze the size and position of these superpixels to determine a calibration for image reconstruction.

A drawback of current techniques is that they neglect possible aberrations in the exit pupil images collected by the sensor. The superpixels can be distorted, shifted, vignetted, or cropped. The aberrations can be field dependent. These aberrations can cause an incorrect calibration to be produced. Examples of systems where the exit pupil image changes with field position include systems that are non-telecentric in image space (the chief rays are not perpendicular to each microlens, and not parallel to the optical axis), systems with distortion (change in magnification of the exit pupil with field position), systems with field curvature, systems with vignetting surfaces, etc.

Thus, there is a need for better calibration techniques for plenoptic imaging systems.

SUMMARY

Various embodiments overcome the limitations of the prior art by calibrating a plenoptic imaging system by controlling the propagation directions of light in object space. An object is adjustable to deliver collimated light propagating along different propagation directions, and possibly also from different lateral locations in the object plane if desired. The plenoptic imaging system under calibration captures plenoptic images of the object adjusted to different propagation directions. The captured plenoptic images include superpixels, each of which includes subpixels. Each subpixel captures light from a corresponding light field viewing direction. Based on the captured plenoptic images, a calibration module calculates which propagation directions map to which subpixels. The mapping defines the light field viewing directions for the subpixels. This can be used to improve processing of plenoptic images captured by the plenoptic imaging system.

Other aspects include components, devices, systems, improvements, methods, processes, applications, computer program products and other technologies related to the foregoing.

BRIEF DESCRIPTION OF THE DRAWINGS

The technology disclosed has other advantages and features which will be more readily apparent from the following detailed description and the appended claims, when taken in conjunction with the accompanying drawings, in which:

FIGS. 3B-3C are ray traces illustrating which rays contribute to which subpixels in a telecentric plenoptic imaging system.

The figures depict embodiments for purposes of illustration only. One skilled in the art will readily recognize from the following discussion that alternative embodiments of the structures and methods illustrated herein may be employed without departing from the principles described herein.

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Various embodiments overcome the limitations of the prior art by calibrating a plenoptic imaging system by controlling the propagation directions of light in object space. An object is adjustable to deliver collimated light propagating along different propagation directions, and possibly also from different lateral locations in the object plane if desired.

One implementation uses collimated light reflected from a mirror in the object plane. The light beam is wide enough to fill the aperture of the primary lens. The propagation direction of the light beam can be controlled by tilting the mirror. By collecting plenoptic images of the beam propagating along different directions in the object plane, a four-dimensional mapping can be established, which inherently accounts for most lens aberrations in the system.

Another implementation uses collimated light reflected from a mirror in the object plane, with the light beam narrow enough to fill only a small portion of the aperture. The lateral position and angular direction of the light beam can be controlled by translating and tilting the mirror. By collecting plenoptic images of the beam at different lateral positions and angular directions in the object plane, a four-dimensional mapping can be established, which inherently accounts for lens aberrations in the system, including lateral distortion. These procedures can be multiplexed by using several beams and/or mirrors simultaneously.

Another implementation uses a pinhole in the aperture of the primary lens. In this case, a non-collimated light source is placed in the object plane. The lateral position of the light source is varied in the object plane and the lateral position of the pinhole is varied in the aperture plane. The correspondence between object-space and pupil-space positions can be used to create a four-dimensional mapping of the plenoptic data, as before.

Figure 1:
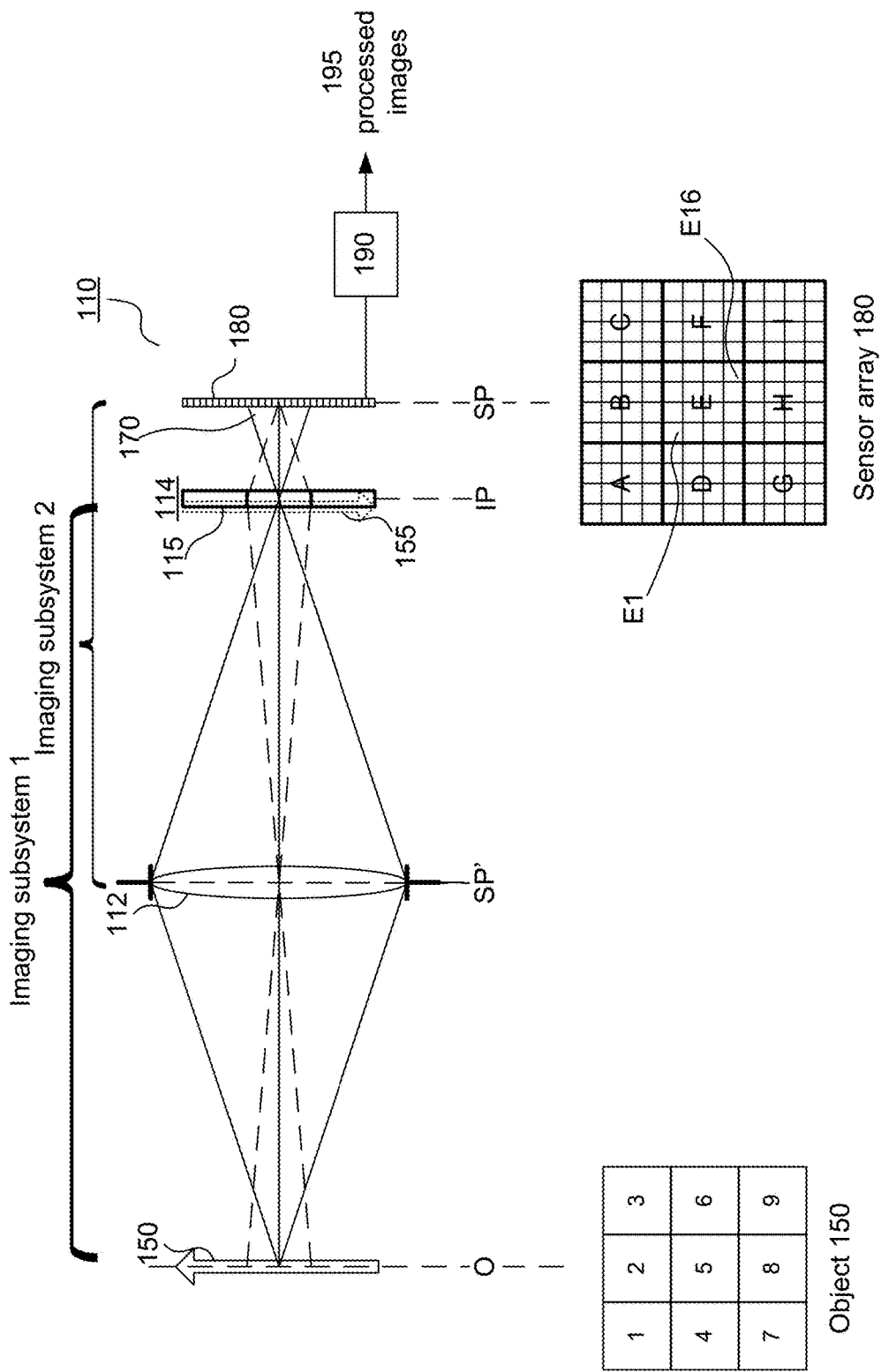
FIG. 1 (prior art) is a diagram illustrating a plenoptic imaging system.

FIG. 1 (prior art) is a diagram illustrating a plenoptic imaging system. The plenoptic imaging system 110 includes primary imaging optics 112 (represented by a single lens in FIG. 1), a secondary imaging array 114 (an array of image forming elements 115) and a sensor array 180. The secondary imaging array 114 may be referred to as a microimaging array. The secondary imaging array 114 and sensor array 180 together may be referred to as a plenoptic sensor module. These components form two overlapping imaging subsystems, shown as subsystem 1 and subsystem 2 in FIG. 1.

For convenience, the imaging optics 112 is depicted in FIG. 1 as a single objective lens, but it should be understood that it could contain multiple elements. The objective lens 112 forms an optical image 155 of the object 150 at an image plane IP. The microimaging array 114 is located at the image plane IP, and each microlens images the aperture of imaging subsystem 1 onto the sensor array 180. That is, the aperture and sensor array are located at conjugate planes SP and SP'. Examples of microimaging arrays 114 include microlens arrays, arrays of pinholes, micromirror arrays, checkerboard grids and waveguide/channel arrays. The microimaging array 114 can be a rectangular array, hexagonal array or other types of arrays. The sensor array 180 is also shown in FIG. 1.

The bottom portion of FIG. 1 provides more detail. In this example, the microimaging array 115 is a 3×3 array of square microlenses. The object 150 is divided into a corresponding 3×3 array of regions, which are labeled 1-9. Each of the regions 1-9 is imaged by the primary imaging subsystem 112 onto one of the microlenses 114. The dashed rays in FIG. 1 show imaging of region 5 onto the corresponding central microlens.

Each microlens images these rays onto a corresponding section of the sensor array 180. The sensor array 180 is shown as a 12×12 rectangular array. The sensor array 180 can be subdivided into superpixels, labelled A-I, with each superpixel corresponding to one of the microlenses and therefore also corresponding to a certain region of the object 150. In FIG. 1, superpixel E corresponds to the central microlens, which corresponds to region 5 of the object. That is, the sensors within superpixel E capture light from region 5 of the object.

Each superpixel is subdivided into subpixels, which are typically individual sensors. In this example, each superpixel has a 4×4 array of subpixels. Each subpixel within a superpixel captures light from the same region of the object, but at different propagation angles. For example, the upper left subpixel E1 in superpixel E captures light from region 5, as does the lower right subpixel E16 in superpixel E. However, the two subpixels capture light propagating in different directions from the object. This can be seen from the solid rays in FIG. 1. All three solid rays originate from the same object point but are captured by different subpixels within the same superpixel. That is because each solid ray propagates along a different direction from the object.

In other words, the object 150 generates a four-dimensional light field $L(x,y,u,v)$, where L is the amplitude, intensity or other measure of a ray originating from spatial location $(x,y)$ propagating in direction $(u,v)$. Each subpixel in the sensor array captures light from a certain volume of the four-dimensional light field. The subpixels are sampling the four-dimensional light field. The shape or boundary of such volume is determined by the characteristics of the plenoptic system.

In certain plenoptic imaging system designs, the sample volumes are hyperrectangles. That is, every sensor within a superpixel captures light from the same rectangular $(x,y)$ region associated with the superpixel, and each subpixel within the superpixel captures light from a different rectangular $(u,v)$ region. However, this is not always the case. For convenience, the superpixels will be described as capturing light from a certain region of the object (even though subpixels within that superpixel may capture light from slightly different regions), and the subpixels will be described as capturing light from a certain range of propagation directions (even though the range may be different for different subpixels, or even for different $(x,y)$ points captured by the same subpixel). Regardless of the details, the plenoptic imaging system creates a plenoptic image 170, which maps $(x,y)$ spatial locations and $(u,v)$ propagation directions to sensors in the array 180. This is in contrast to a conventional image, which maps (x,y) spatial locations to sensors but loses information about the (u,v) propagation directions.

Because the plenoptic image 170 contains information about the four-dimensional light field produced by the object, the processing module 190 can be used to perform different types of analysis, such as depth estimation, three-dimensional reconstruction, synthetic refocusing, extending the depth of focus, spectral analysis and other types of multi-view analysis.

However, many of these analyses depend on the mapping from the light field coordinates (x,y,u,v) to the subpixels, which are typically individual sensors. That is, each individual sensor captures a certain volume of the four-dimensional light field. Having an accurate knowledge of which sensor captures which volume is important for good processing of the captured plenoptic image. For convenience, the (x,y) region that maps to a subpixel will be referred to as the light field viewing region for that subpixel, and the (u,v) region that maps to a subpixel will be referred to as the light field viewing direction for that subpixel.

Figure 2:
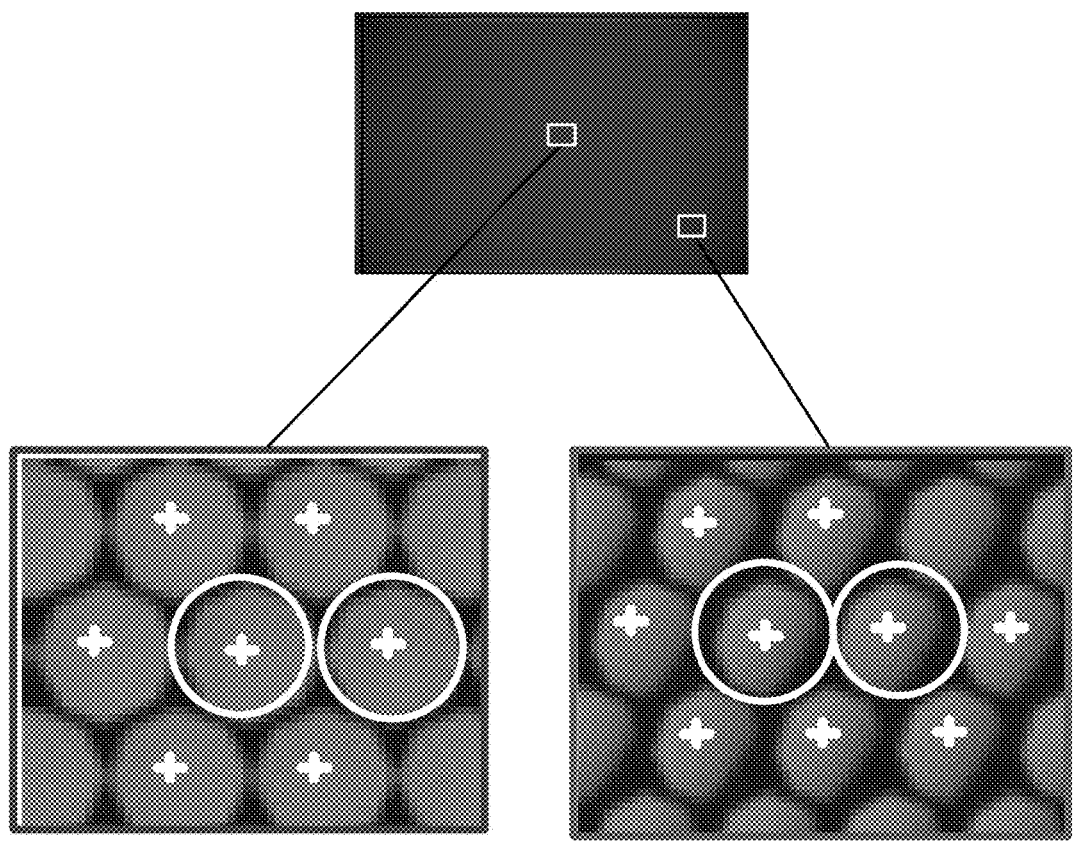
FIG. 2 are photographs illustrating the difference between on-axis and off-axis responses.

In many cases, these quantities are based on assumptions regarding paraxial behavior, telecentric optics, or absence of distortion, vignetting and aberrations. However, these are not always good assumptions, as demonstrated by FIG. 2. FIG. 2 are photographs illustrating the difference between on-axis and off-axis responses. The top image in FIG. 2 shows a captured plenoptic image. The bottom left image is a magnification of a center (on-axis) portion of the plenoptic image. The bottom right image is a magnification of a perimeter (off-axis) portion of the plenoptic image. The crosses in each image mark the centers of superpixels, and the circles mark the boundaries of the superpixels. It can be seen that the on-axis response is not the same as the off-axis response. Under the standard assumptions, the on-axis and off-axis responses should be the same.

Figure 3A:
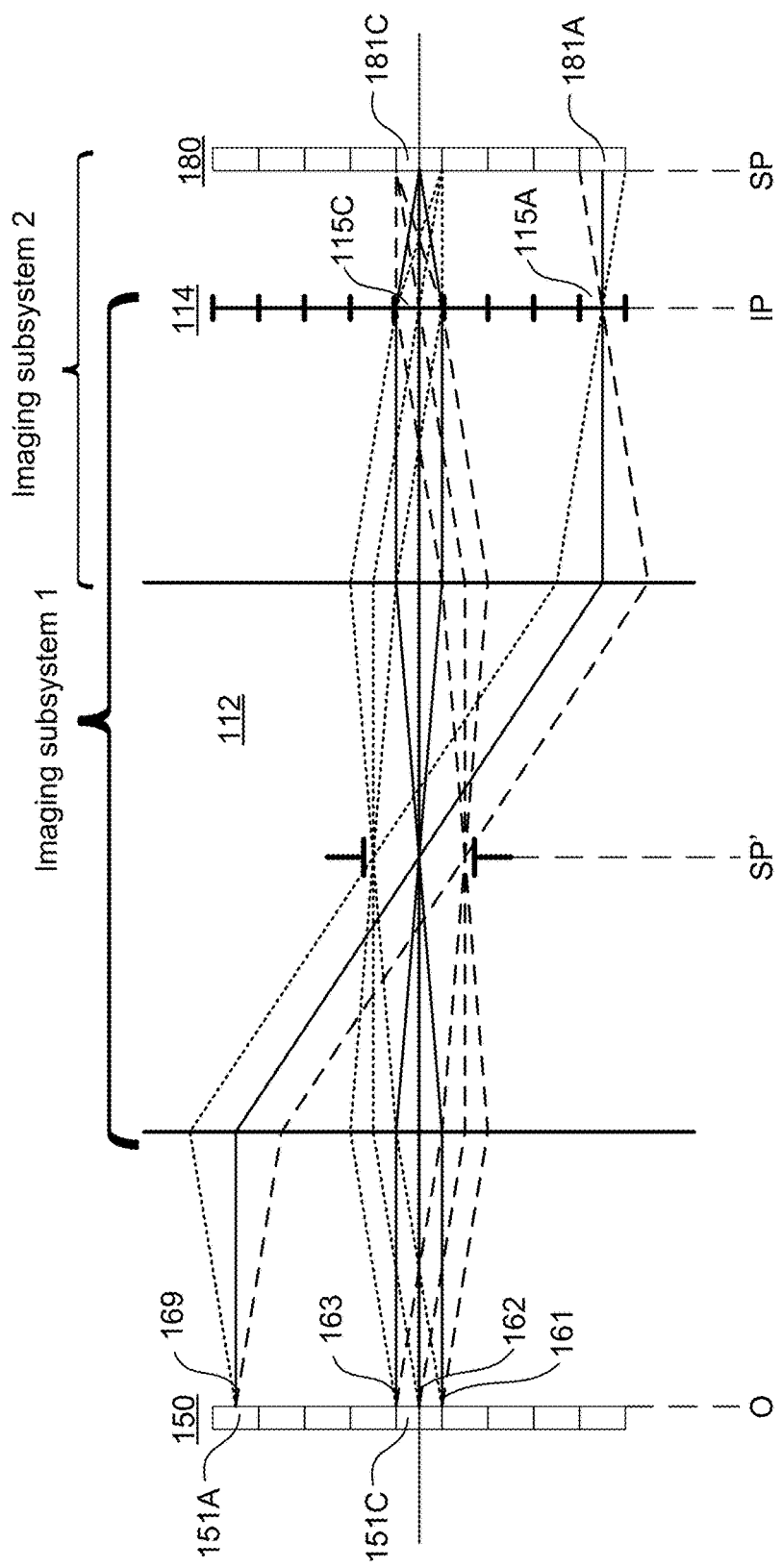
FIG. 3A is a ray trace from object to superpixels in a telecentric plenoptic imaging system.
Figure 3D:
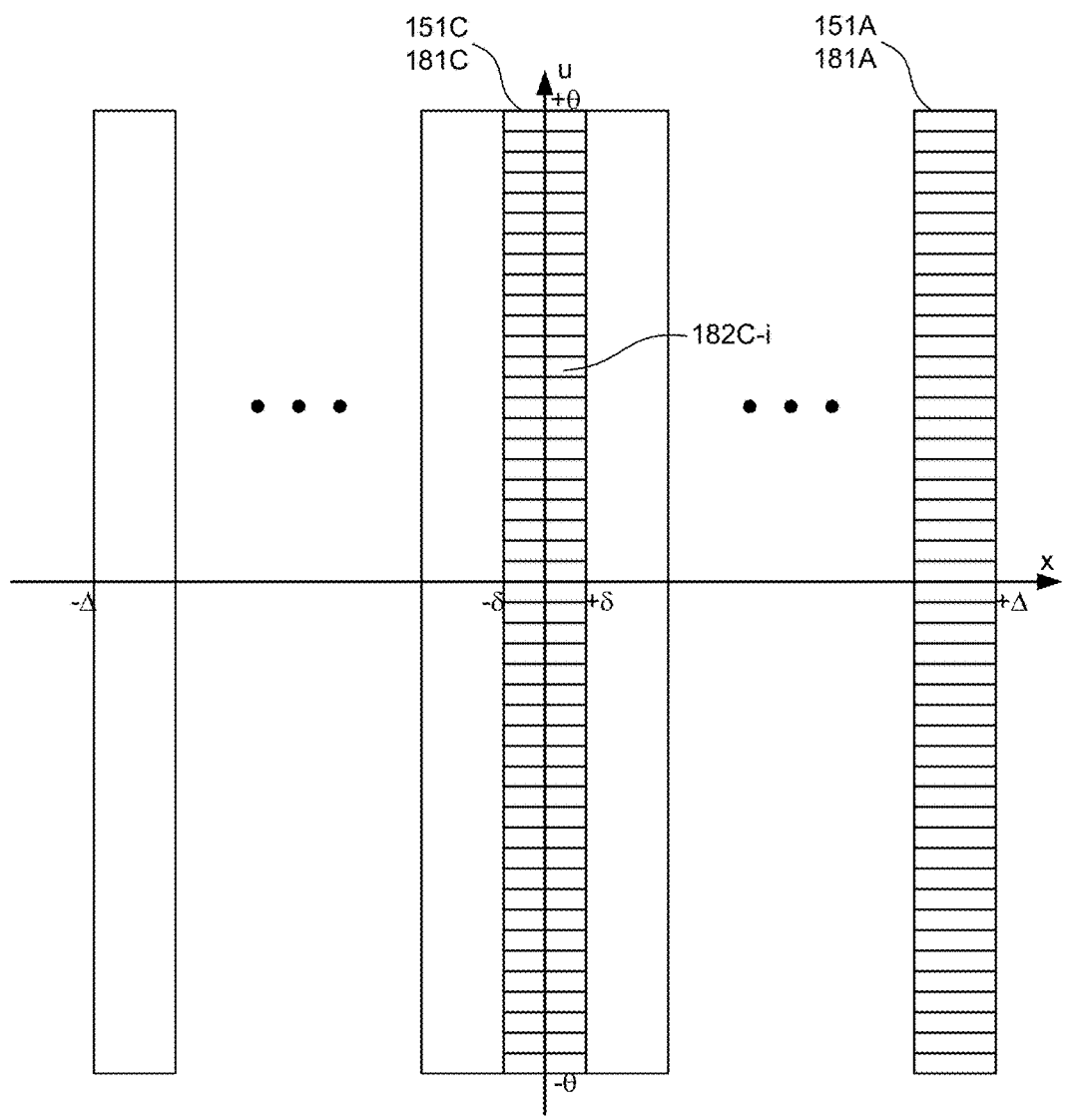
FIG. 3D is a mapping of object space light field to subpixels and superpixels, in a telecentric plenoptic imaging system.
Figure 4:
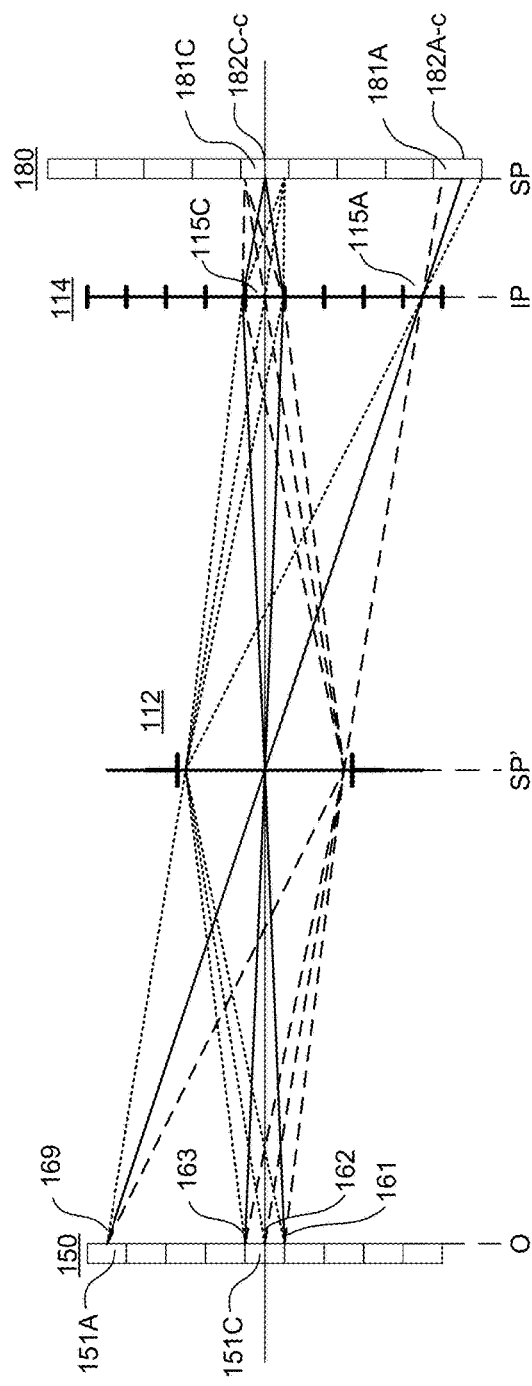
FIG. 4 is a ray trace from object to superpixels in a non-telecentric plenoptic imaging system.
Figure 5:
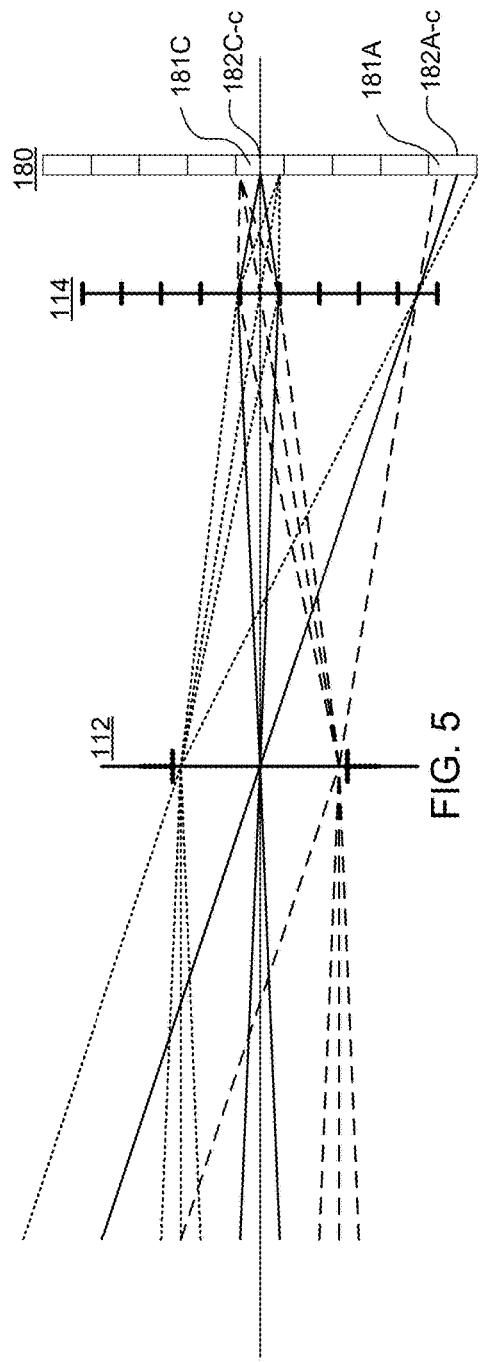
FIG. 5 is a ray trace from object to superpixels in an infinite conjugate plenoptic imaging system.

FIGS. 3-5 further illustrate this. FIG. 3A is a ray trace from object to superpixels in a telecentric plenoptic imaging system. For clarity, different optical elements are represented by lines rather than by lens shapes. The object 150 is subdivided into regions 151. The primary optics 112 are represented by the two long vertical lines and the aperture between them. The secondary imaging array 114 is represented by a vertical line subdivided by short horizontal hashes. The hashes show the boundaries between microlenses. The sensor array 180 is subdivided into superpixels 181. Each subdivision of object 180 is a superpixel 181 corresponding to one of the microlenses 114. Similarly, each subdivision 151 of object 150 also corresponds to one of the microlenses 114. For example, the light originating from central object region 151C is imaged by the primary optics 112 onto the central microlens 115C. This light is, in turn, captured by the subpixels within central superpixel 181C. At the edge of the object, the light originating from object region 151A is imaged by the primary optics 112 onto the microlens 115A. This light is, in turn, captured by the subpixels within superpixel 181A.

Now consider the various rays shown in FIG. 3A. Different ray bundles are used for different object points (i.e., different x,y coordinates). Rays 162 originate from the center of central region 151C, rays 163 originate from the top edge of central region 151C and rays 161 originate from the bottom edge of central region 151C. Rays 169 originate from the center of edge region 151A. There are three rays in each ray bundle. Different line types are used for different propagation directions (i.e., different u,v coordinates). Solid rays are the chief rays of each ray bundle. The short dashed rays are the top edge (sagittal or tangential) rays of each ray bundle, and the long dashed rays are the bottom edge rays of each ray bundle. In this case, since the primary imaging subsystem is telecentric, the chief rays of all the ray bundles are always on-axis and parallel to each other in both object space and in image space. The chief rays through each microlens are parallel to the optical axis. The top and bottom edge rays are also always parallel to each other in both object space and in image space.

FIG. 3A shows how rays propagate from various object points to the sensor array. FIGS. 3B-3C illustrate the inverse. They are ray traces illustrating which rays contribute to which subpixels in a telecentric plenoptic imaging system. FIG. 3B shows just the solid rays from FIG. 3A (plus two additional solid rays not shown in FIG. 3A). Consider first the central superpixel 181C. That superpixel contains many subpixels 182. The central subpixel of central superpixel 181C is labelled 182C-c in FIG. 3B. Note that subpixel 182C-c captures the light that originates anywhere in central object region 151C, but propagating only parallel to the optical axis. Similarly, subpixel 182A-c captures the light that originates anywhere in edge object region 151A, but propagating only parallel to the optical axis.

FIG. 3C shows just the short dashed rays from FIG. 3A. Analogous observations can be made. Subpixel 182C-a captures the light that originates anywhere in central object region 151C, but propagating only at the angle shown. Similarly, subpixel 182A-a captures the light that originates anywhere in edge object region 151A, but propagating only at the angle shown.

These observations can be extended to the other superpixels and rays. The result is a mapping from the four-dimensional light field (x,y,u,v) to the subpixels i of the superpixels n of the sensor array. FIG. 3D shows a two-dimensional version of this mapping based on the example in FIGS. 3A-C. FIG. 3D is a mapping of object space light field to subpixels and superpixels, in a telecentric plenoptic imaging system. The coordinates in FIG. 3D are x, the spatial coordinate in object space, and u, the propagation direction in object space. Referring to FIGS. 3A-3C, let $2\Delta$ be the size of the object and $2\delta$ be the size of each region within the object. That is, the object extends from $-\Delta$ to $+\Delta$, and each region within the object has a width of $-\delta$ to $+\delta$. Similarly, let $2\theta$ be the angular extent of the ray bundles from the object. That is, the short dashed rays in FIG. 3 propagate along a direction $u=+\theta$, the solid rays propagate along a direction $u=0$, and the long dashed rays propagate along a direction $u=-\theta$.

The tall skinny rectangles in FIG. 3D are the different regions 151 from FIG. 3. Edge region 151A and central region 151C are labeled in FIG. 3D. Each region is mapped to a corresponding superpixel: edge region 151A to edge superpixel 181A, and central region 151C to central superpixel 181C. Region 151C further shows the mapping to subpixels within a superpixel. Each small rectangle within 151C represents a different subpixel 182C-i within superpixel 181C.

In a system that is telecentric in both object and image space and without vignetting, the other superpixels 181 have similar subpixel mappings and the overall mapping is symmetric and regular. Each superpixel 181 has the same size and shape and each superpixel captures all rays originating from the corresponding region 151 of the object (i.e., all u values for the range of x values defined by the corresponding region 151). The subpixel structure within each superpixel is also the same for all the superpixels. Each subpixel captures rays for all x values within the superpixel, for a range of u values defined by the subpixel. In other words, the superpixels 181 are rectangular in shape in FIG. 3D, and the superpixel rectangles 181 are subdivided into smaller subpixel rectangles 182. As shown in FIG. 3D, the division of superpixel 151C into subpixels is the same as the division of superpixel 151A into subpixels. So if subpixel 182C-12 captures the on-axis rays from region 151C, then the same subpixel 182A-12 will capture the on-axis rays from region 151A.

However, this regular structure does not hold for all plenoptic imaging systems. FIG. 4 is a ray trace from object to superpixels in a non-telecentric plenoptic imaging system. The same nomenclature is used for the rays as in FIG. 3. In this example, subpixel 182C-c still captures all of the solid central rays from region 151C. However, these rays are not all on-axis rays. The rays from ray bundles 161, 163 have a slight tilt to them, although this tilt may be negligible if the microlenses are small compared to the object distance. More importantly, the center subpixel 182A-c of the edge superpixel also captures solid central rays from region 151A. However, all of these rays are significantly tilted. Compare the solid ray from ray bundle 169 in FIG. 4 to the solid ray from ray bundle 169 in FIG. 3A. Therefore, while the plenoptic imaging system of FIG. 4 does have a mapping of the light field coordinate (x,y,u,v) to superpixel/subpixel coordinates (n,i), the mapping will not have the same regular structure shown in FIG. 3D.

FIG. 5 is a ray trace from object to superpixels in an infinite conjugate plenoptic imaging system. Note that since the object is at infinity, the (x,y) light field coordinates correspond to the direction of the rays and the (u,v) light field coordinates correspond to the position of the rays within the aperture. So rays from the same ray bundle have the same (x,y) light field coordinates, as in FIGS. 3-4. Each superpixel captures light propagating along certain directions in object space. Every subpixel with that superpixel will capture light propagating along the same direction in object space. However, different subpixels will capture light propagating through different locations of the aperture.

However, this regular structure does not hold for all plenoptic imaging systems. FIG. 4 is a ray trace from object to superpixels in a non-telecentric plenoptic imaging system. The same nomenclature is used for the rays as in FIG. 3. In this example, subpixel 182C-c still captures all of the solid central rays from region 151C. However, these rays are not all on-axis rays. The blue and green rays have a slight tilt to them, although this tilt may be negligible if the microlenses are small compared to the object distance. More importantly, the center subpixel 182A-c of the edge superpixel also captures solid central rays from region 151A. However, all of these rays are significantly tilted. Compare the solid red ray in FIG. 4 to the solid red ray in FIG. 3A. Therefore, while the plenoptic imaging system of FIG. 4 does have a mapping of the light field coordinate (x,y,u,v) to superpixel/subpixel coordinates (n,i), the mapping will not have the same regular structure shown in FIG. 3D.

FIG. 5 is a ray trace from object to superpixels in an infinite conjugate plenoptic imaging system. Note that since the object is at infinity, the (x,y) light field coordinates correspond to the direction of the rays and the (u,v) light field coordinates correspond to the position of the rays within the aperture. So same color rays have the same (x,y) light field coordinates, as in FIGS. 3-4. Each superpixel captures light propagating along certain directions in object space. Every subpixel with that superpixel will capture light propagating along the same direction in object space. However, different subpixels will capture light propagating through different locations of the aperture.

Calibration can be used to obtain a more accurate estimate of which light field coordinates map to which subpixels. Recall that the light field viewing region for a subpixel is the (x,y) region of the object that maps to the subpixel, and the light field viewing direction for a subpixel is the (u,v) propagation directions that maps to the subpixel. The light field viewing regions are less complex to estimate. However, the light field viewing directions can be more difficult to estimate.

Figure 6A:
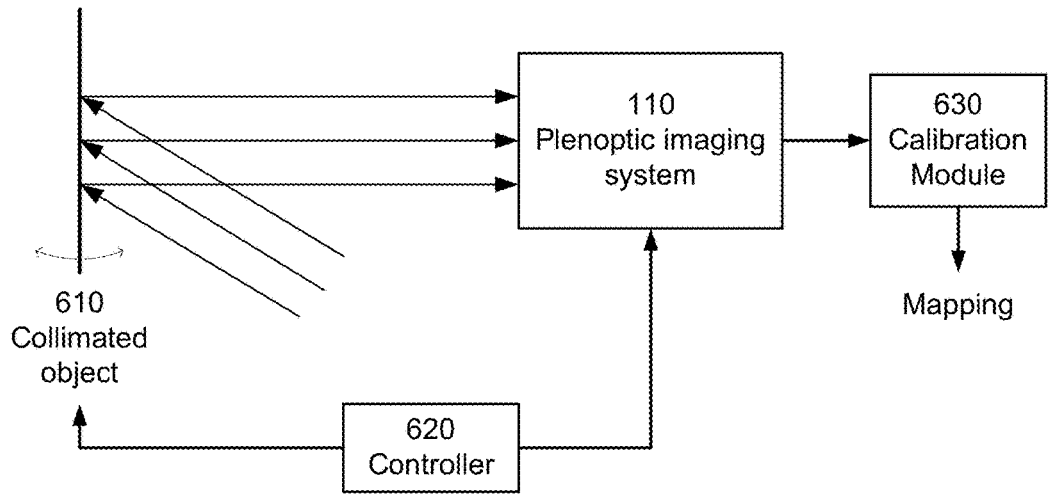
FIG. 6A is a diagram of a system for object space calibration of a plenoptic imaging system.

FIG. 6A is a diagram of a system for object space calibration of a plenoptic imaging system. It can be used to calibrate the light field viewing directions for a plenoptic imaging system. The system includes an adjustable collimated object 610. The object 610 produces collimated light. The propagation direction of the collimated light can be adjusted, for example by using a tiltable mirror. The plenoptic imaging system 110 under calibration captures the resulting plenoptic images. Different plenoptic images are captured with the object adjusted to different propagation directions. A calibration module 630 calculates the mapping of propagation directions to subpixels based on the captured plenoptic images. This mapping also defines the light field viewing directions for the subpixels.

This approach is a direct sampling of the mapping. Each plenoptic image corresponds to an object for which all the light is propagating along a known propagation direction. The plenoptic image indicates which subpixels within each superpixel capture the light from that light field viewing direction. In some cases, more than one subpixel may capture the light. If so, in one approach, the mapping is based on calculating a centroid for the light captured within each superpixel.

Preferably, a controller 620 automatically adjusts the object to different propagation directions and coordinates the capture of corresponding plenoptic images. If there are N subpixels per superpixel, the controller preferably takes at least N samples, although values could be interpolated if less than N samples were taken. If the plenoptic imaging system has symmetry, the controller 620 could sample in a way that takes advantage of the symmetry.

Once the mapping is created, it may be stored, for example as a lookup table (LUT). The mapping is then used for processing of captured plenoptic images, such as depth mapping or other types of image reconstruction. The LUT may be interpolated for values not stored directly in the LUT.

Figure 6B:
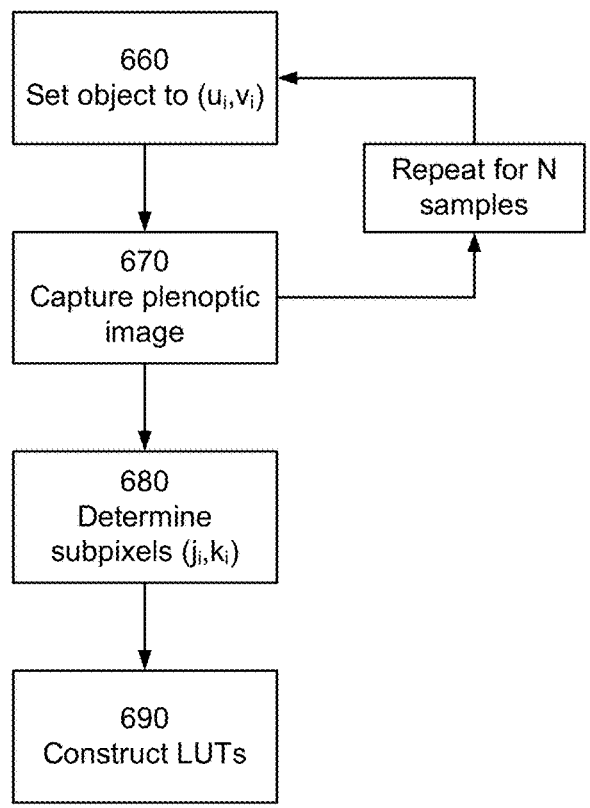
FIG. 6B is a flow diagram of an example calibration method which can be implemented by the system shown in FIG. 6A.

FIG. 6B is a flow diagram of an example calibration method which can be implemented by the system shown in FIG. 6A. Let $Imn(j,k;u,v)$ be the light captured by subpixel (j,k) of superpixel(m,n), from a collimated object propagating along direction (u,v) in object space. For sample i, the controller 620 sets 660 the object propagation direction to $(u_i,v_i)$. The corresponding plenoptic image $Imn_i(j,k;u_i,v_i)$ is captured 670. This is repeated for N samples. The subpixels for each superpixel(m,n) are processed separately to determine 680 the values of $(j_i,k_i)$ which correspond to sample i. This could be done in different ways. In one approach, the values are determined by $$\text{For each superpixel}(m,n): (j_i,k_i) = \text{argmax}_{j,k} Imn_i(j,k;u_i,v_i) \qquad (1)$$

That is, the sensor that collects the most light determines $(j_i,k_i)$. In a different approach, $$\text{For each superpixel}(m,n): (j_i,k_i) = \text{centroid}\{Imn_i(j,k;u_i,v_i)\} \qquad (2)$$

That is, the centroid of the intensity distribution determines $(j_i,k_i)$. Note that while (j,k) in $Imn_i(j,k;u_i,v_i)$ are discrete, the values $(j_i,k_i)$ could be continuous. For example, the centroid approach may predict that the superpixel response is centered between two neighboring subpixels.

If the controller 620 samples the object at N different viewing directions $(u_i, v_i)$, then up to N corresponding $(j_i, k_i)$ subpixel coordinates are also identified. A lookup table can then be constructed 690, mapping propagation direction $(u_i, v_i)$ to corresponding subpixel coordinate $(j_i, k_i)$ $$\text{LUT1: For each superpixel}(m,n):(u_i,v_i) \rightarrow (j_i,k_i) \quad (3)$$

This lookup table may be useful to reconstruct multiviews corresponding to different viewing directions, because each view should represent the same viewing direction. That is, to reconstruct a view from viewing direction $(u_0, v_0)$, we located the subpixel locations $(j,k)$ that correspond to $(u_0, v_0)$ within each superpixel.

From LUT 1, the reverse lookup table can also be constructed 690, mapping each subpixel$(j,k)$ to the corresponding propagation direction (aka, viewing direction) $(u_{jk}, v_{jk})$ $$\text{LUT2: For each superpixel}(m,n):(j,k) \rightarrow (u_{jk},v_{jk}) \quad (4)$$

This lookup table may be useful to estimate surface properties, for example.

Note that a different lookup table can be constructed for each superpixel$(m,n)$, because the mapping between $(u,v)$ and $(j,k)$ can be different for different superpixels. In previous approaches, the mapping between $(u,v)$ and $(j,k)$ was assumed to be the same for all superpixels, leading to errors.

Figure 7A:
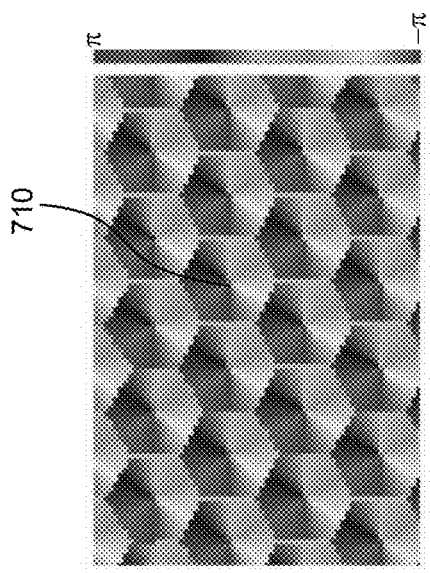
FIGS. 7A-7B are mappings of zenith angle and azimuth angle, respectively, of light field viewing directions to on-axis subpixels.
Figure 7B:
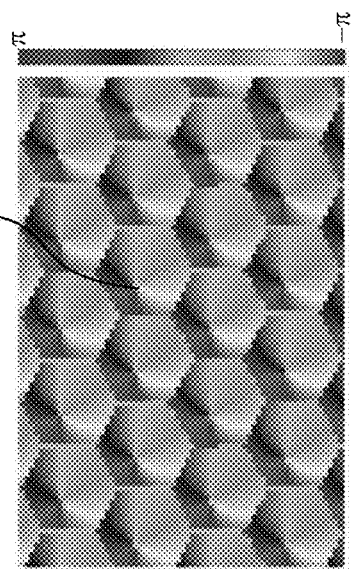

FIGS. 7-8 show the results of a calibration using 72 different positions for the collimated object. In this example, the secondary imaging array is hexagonally packed. FIGS. 7A-7B are mappings of zenith angle and azimuth angle, respectively, of light field viewing directions to on-axis subpixels. They show the mapping of light field viewing direction to an on-axis set of superpixels, i.e., superpixels that are near the center of the sensor array. The light field viewing direction is a two-dimensional quantity. This example uses polar coordinates. FIG. 7A shows the zenith angle from 0 to $\pi/2$ in grayscale and FIG. 7B shows the azimuth angle from $-\pi$ to $+\pi$ in pseudocolor. The point where all the colors meet in FIG. 7B is the subpixel which captures the on-axis rays from the object. It is marked 710 for one of the superpixels. Note that this point is approximately in the center of each on-axis superpixel.

Figure 8A:
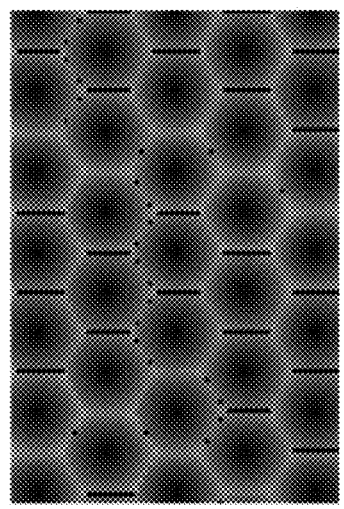
FIGS. 8A-8B are mappings of zenith angle and azimuth angle, respectively, of light field viewing directions to off-axis subpixels.
Figure 8B:
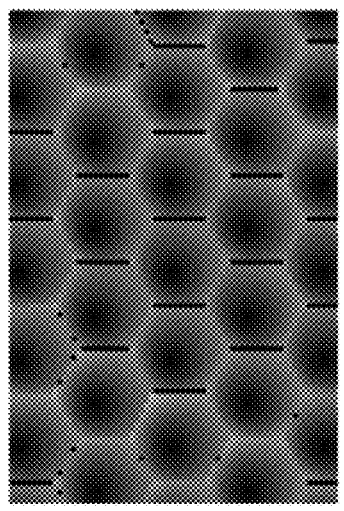

FIGS. 8A-8B are mappings of zenith angle and azimuth angle, respectively, of light field viewing directions to off-axis subpixels. They show the same quantities as FIGS. 7A-7B, but for an off-axis set of superpixels, i.e., superpixels that are near the edge of the sensor array. In the telecentric case, FIGS. 7 and 8 would look the same. However, that is not the case here. For example, the center point 810 is shifted relative to the center of the superpixels.

Figure 9A:
FIG. 9A is a three-dimensional reconstruction of an object, without using object-space calibration.
Figure 9B:
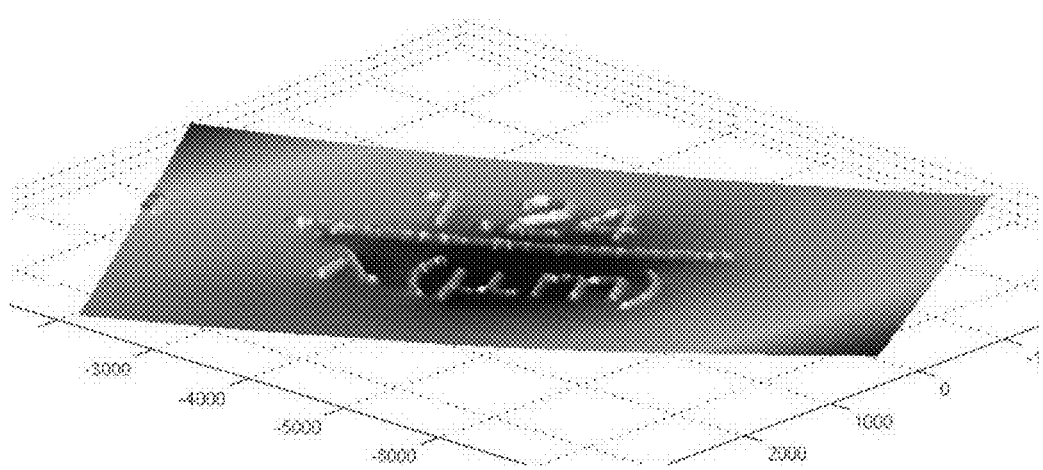
FIG. 9B is a three-dimensional reconstruction of the same object, but using object-space calibration.

FIGS. 9A-9B show the effect of this calibration. FIG. 9A is a three-dimensional reconstruction of an object, without using object-space calibration. Specifically, it shows a three-dimensional rendering of a ruler card from a captured plenoptic image, but where the plenoptic imaging system was not calibrated. The card is flat, but the reconstruction shows a curve caused by the incorrect assumptions about the light field viewing directions of the subpixels. FIG. 9B is a three-dimensional reconstruction of the same object, but using object-space calibration. It shows the same rendering as FIG. 9A, but this time with calibration. The curve artifact is no longer present.

Although the detailed description contains many specifics, these should not be construed as limiting the scope of the invention but merely as illustrating different examples and aspects. It should be appreciated that the scope of the invention includes other embodiments not discussed in detail above. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

In alternate embodiments, aspects of the invention are implemented in computer hardware, firmware, software, and/or combinations thereof. Apparatus can be implemented in a computer program product tangibly embodied in a non-transitory machine-readable storage device for execution by a programmable processor; and method steps can be performed by a programmable processor executing a program of instructions to perform functions by operating on input data and generating output. Embodiments can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

What is claimed is:

1. A method for calibrating a plenoptic imaging system, the plenoptic imaging system including primary imaging optics, a secondary imaging array and a sensor array, the method comprising:

the plenoptic imaging system capturing a plurality of plenoptic images of a light source that produces non-collimated light that is imaged through a pinhole located at a pupil of the primary imaging optics, each plenoptic image comprising a plurality of superpixels, each superpixel comprising a plurality of subpixels;

automatically adjusting a lateral position of at least one of the light source and the pinhole, the plenoptic imaging system automatically capturing plenoptic images for the different lateral positions;

based on the captured plenoptic images, calculating a mapping of spatial locations and/or propagation directions in object space of the plenoptic imaging system to subpixels in the plenoptic image, the mapping defining light field viewing regions and/or light field viewing directions for the subpixels; and after calculating the mapping, the plenoptic imaging system capturing a second plenoptic image of a second object, and processing the second plenoptic image using the calculated mapping to account for the light field viewing regions and/or light field viewing directions for the subpixels.

2. The method of claim 1 wherein automatically adjusting a lateral position of at least one of the light source and the pinhole comprises automatically adjusting a lateral position of the light source while maintaining the pinhole in a fixed lateral position.

3. The method of claim 1 wherein automatically adjusting a lateral position of at least one of the light source and the pinhole comprises automatically adjusting a lateral position of the pinhole while maintaining the light source in a fixed lateral position.

4. The method of claim 1 wherein automatically adjusting a lateral position of at least one of the light source and the pinhole comprises automatically adjusting a lateral position of the light source and automatically adjusting a lateral position of the pinhole, wherein each combination of lateral position of the light source and lateral position of the pinhole provides a sampling of the spatial location and of the propagation direction in object space.

5. The method of claim 1 wherein calculating the mapping comprises, for each captured plenoptic image, constructing a correspondence between (a) a spatial location of the light source and a propagation direction from the light source to the pinhole, and (b) a subpixel in the plenoptic image; wherein the aggregate correspondences for all captured plenoptic images defines light field viewing regions and/or light field viewing directions for the subpixels.

6. The method of claim 1 wherein calculating a mapping comprises creating a lookup table that maps light field viewing regions and/or light field viewing directions to subpixels.

7. The method of claim 1 wherein calculating a mapping comprises creating a lookup table that maps subpixels to light field viewing regions and/or light field viewing directions.

8. A system for calibrating a plenoptic imaging system, the system comprising:
  a light source that produces non-collimated light;
  a plenoptic imaging system including primary imaging optics, a secondary imaging array and a sensor array;
  a pinhole located at a pupil of the primary imaging optics, wherein at least one of the light source and the pinhole is adjustable in lateral position;
  the plenoptic imaging system capturing plenoptic images of the light source imaged through the pinhole at different lateral positions of at least one of the light source and the pinhole, each plenoptic image comprising a plurality of superpixels, each superpixel comprising a plurality of subpixels; and
  a calibration module that, based on the captured plenoptic images, calculates a mapping of spatial locations and/or propagation directions in object space of the plenoptic imaging system to subpixels in the plenoptic image, the mapping defining light field viewing regions and/or light field viewing directions for the subpixels.

9. The method of claim 8 wherein the plenoptic imaging system captures plenoptic images of the light source imaged through the pinhole at different lateral positions of the light source with the pinhole in a fixed lateral position.

10. The method of claim 8 wherein the plenoptic imaging system captures plenoptic images of the light source imaged through the pinhole at different lateral positions of the pinhole with the light source in a fixed lateral position.

11. The method of claim 8 wherein the plenoptic imaging system captures plenoptic images of the light source imaged through the pinhole at different combinations of lateral positions of the light source and lateral positions of the pinhole, wherein each combination provides a sampling of the spatial location and of the propagation direction in object space.

12. The method of claim 11 wherein the spatial location in object space is determined by the lateral position of the light source, and the propagation direction in object space is determined by the direction from the light source to the pinhole.

13. The method of claim 8 wherein the calibration module creates a lookup table that maps light field viewing regions and/or light field viewing directions to subpixels.

14. The method of claim 8 wherein the calibration module creates a lookup table that maps subpixels to light field viewing regions and/or light field viewing directions.

15. The method of claim 8 wherein the plenoptic imaging system is not object-space telecentric.

16. The method of claim 8 wherein the plenoptic imaging system is not image-space telecentric.

17. The method of claim 8 wherein the plenoptic imaging system has finite conjugates.

18. The method of claim 8 further comprising:
  a processing module that processes a plenoptic image of an object, said processing taking into account the light field viewing regions and/or light field viewing directions for the subpixels as determined by the calibration module.

19. A computer program product for calibrating a plenoptic imaging system, the computer program product comprising a non-transitory machine-readable medium storing computer program code for performing a method, the method comprising:
  automatically adjusting at least one of (a) a lateral position of a light source that produces non-collimated light and (b) a lateral position of a pinhole located at a pupil of primary imaging optics of a plenoptic imaging system, the plenoptic imaging system automatically capturing plenoptic images of the light source imaged through the pinhole for the different lateral positions;
  accessing the plenoptic images captured by the plenoptic imaging system, each plenoptic image comprising a plurality of superpixels, each superpixel comprising a plurality of subpixels;
  based on the captured plenoptic images, calculating a mapping of spatial locations and/or propagation directions in object space of the plenoptic imaging system to subpixels in the plenoptic image, the mapping defining light field viewing regions and/or light field viewing directions for the subpixels; and
  after calculating the mapping, processing a second plenoptic image captured by the plenoptic imaging system, said processing using the calculated mapping to account for the light field viewing regions and/or light field viewing directions for the subpixels.

20. The computer program product claim 19 wherein:
  automatically adjusting at least one of (a) a lateral position of the light source and (b) a lateral position of the pinhole comprises automatically adjusting the lateral position of the light source and automatically adjusting the lateral position of the pinhole, wherein each combination of lateral position of the light source and lateral position of the pinhole provides a sampling of the spatial location and of the propagation direction in object space; and
  calculating the mapping comprises, for each captured plenoptic image, constructing a correspondence between (a) a spatial location of the light source and a propagation direction from the light source to the pinhole, and (b) a subpixel in the plenoptic image; wherein the aggregate correspondences for all captured plenoptic images defines light field viewing regions and/or light field viewing directions for the subpixels.

* * * * *